United States Patent [19]
Gross et al.

[11] Patent Number: 5,952,655
[45] Date of Patent: Sep. 14, 1999

[54] ULTRA-HIGH SENSITIVITY RADIATION DETECTION APPARATUS AND METHOD

[75] Inventors: Kenneth C. Gross, Bolingbrook, Ill.; John D. Valentine, Cincinnati, Ohio; Francis Markum, Joliet, Ill.; Mary Zawadzki, Rouses Point, N.Y.; Charles Dickerman, Downers Grove, Ill.

[73] Assignees: The United States of America as represented by the United States Department of Energy, Washington, D.C.; University of Cincinnati, Cincinnati, Ohio

[21] Appl. No.: 08/904,587

[22] Filed: Aug. 1, 1997

[51] Int. Cl.$^6$ .................................................. G01T 1/167
[52] U.S. Cl. .......................... 250/304; 250/255; 250/364
[58] Field of Search ...................... 250/253, 255, 250/304, 395, 356.1, 364, 371, 370.01, 374

[56] References Cited

U.S. PATENT DOCUMENTS

| | | |
|---|---|---|
| 3,887,339 | 6/1975 | Robertson et al. . |
| 3,968,371 | 7/1976 | Greendale . |

FOREIGN PATENT DOCUMENTS

53-25792  3/1978  Japan .

*Primary Examiner*—Constantine Hannaher
*Assistant Examiner*—Darren M. Jiron
*Attorney, Agent, or Firm*—Joy Alwan; Thomas G. Anderson; William R. Moser

[57] ABSTRACT

A method and apparatus are provided to concentrate and detect very low levels of radioactive noble gases from the atmosphere. More specifically the invention provides a method and apparatus to concentrate xenon, krypton and radon in an organic fluid and to detect these gases by the radioactive emissions.

19 Claims, 8 Drawing Sheets

ULTRA-HIGH SENSITIVITY RADIATION DETECTION APPARATUS AND METHOD

CONTRACTUAL ORIGIN OF THE INVENTION

The United States Government has rights in this invention pursuant to Contract Number W-31-109-ENG-38 between the U.S. Department of Energy and the University of Chicago representing Argonne National Laboratory

BACKGROUND OF THE INVENTION

1. Field of the Invention

The present invention relates to a method to concentrate and detect radioactive gases. In particular it relates to a method to concentrate and detect radioactive gases released into the atmosphere during nuclear testing or accidental emissions. The present invention also relates to a method to detect naturally released radon from environmental samples and to detect radon for long term monitoring.

2. Background of the Invention

A need exists to detect the testing of nuclear weapons in the atmosphere as well as to detect accidental leaks of radioactive materials. Nuclear testing and nuclear power plant accidents release radioactive fission products into the atmosphere. These fission products include isotopes of the noble gases. The United States has entered into a Comprehensive Test Ban Treaty (CTBT).

To monitor compliance with the treaty terms and detect accidental leaks of radioactive material, a means for testing must be available. Currently, one of the best methods for compliance surveillance is by detection of fission products in the atmosphere. Radioactive isotopes of the noble gases provide a good means for detection of nuclear testing. All other fission products are chemically reactive to some extent, and can wash out of the atmosphere by precipitation or combine with other chemicals and precipitate from the atmosphere.

Radioactive isotopes of noble gases disburse in the atmosphere and travel long distances from the site of their release. In the case of underground nuclear testing, most fission products are prevented from getting into the atmosphere. Noble gas fission products emanating from the ground may be the most significant source for radio nuclide monitoring. Among the radioactive noble gases, xenon is the most abundant a few days after detonation. By measuring the atmospheric activities of different xenon radioisotopes (Xe-133, Xe-133m, and Xe-135) as a function of time, a nuclear detonation can be confirmed based on the ratio of these radioxenons exceeding normal ambient levels.

Radioactive krypton and xenon isotopes are primarily gamma and beta emitters. In sufficient concentrations, these isotopes may be readily detected with a range of conventional radiation detectors. For CTBT surveillance purposes, however, the concentrations can be on the order of parts per billion, and do not therefore give sufficient counts to be distinguished from natural background radiation.

The concentration of radon in the environment varies with geography and site conditions. With regard to higher concentrations of radon, many techniques are available for the measurement within an enclosed environment. The U.S. EPA has developed measurement protocols for seven measurement systems. The advantages and disadvantages of those systems are reviewed in the EPA publication, "Radon/Radon Progeny Cumulative Proficiency Report" (EPA-No. 5201/1-86-008), incorporated herein by reference. The seven tested measurement systems include alpha track detectors, charcoal canister gas collectors, continuous radon monitors, continuous working level monitors, grab radon gas sampling, grab working level sampling, and progeny sampling. The most common method is the charcoal canister method. A mechanically dried quantity of activated charcoal having a high surface area to weight ratio is passively exposed to the radon containing atmosphere for a set period of time. The charcoal becomes partially saturated with the gas. The charcoal is then placed in a photo spectrometer and the natural radioactive decay products are measured. In U.S. Pat. No. 4,801,800 the use of a forced air system to concentrate the gas in a shortened period of time is disclosed.

Charcoal has a number of disadvantages when used to collect noble gases. At ambient temperatures, charcoal has a relatively low adsorption coefficient for noble gases which would necessitate very large adsorption volumes to concentrate the parts per billion traces of noble gases in the atmosphere. Charcoal also has a known affinity for water vapor, which decreases its adsorption capacity for noble gases. Airborne contaminants may also build up on the charcoal decreasing its load capacity. Contaminant build up would require equipment designed to regenerate the charcoal while in use. The volume of charcoal required may be lowered by operating at a cryogenic temperature. However, this also adds equipment and any rise in temperature would result in the release of radioactive gases.

The present invention addresses the need to detect low levels of radioactive gas in atmospheric samples. The invention provides a method to concentrate very low level radioactive gases in an organic fluid to efficiently reach detectable levels while overcoming the limitations of prior methods.

SUMMARY OF THE INVENTION

It is an object of the present invention to provide a method for the detection of nuclear weapons testing.

It is a further object of the present invention to provide a method to concentrate parts per million to parts per trillion levels of noble gases.

It is a further object of the present invention to provide a method to concentrate and detect radioactive krypton and xenon in the atmosphere to monitor nuclear weapons testing.

It is a further object of the present invention to concentrate and detect radon in environmental samples.

It is a further object of the invention to provide a safe, economical organic fluid to concentrate radioactive gases.

It is a further object of the present invention to provide a method to concentrate and detect radioactive krypton and xenon in the atmosphere that may escape from nuclear fuel during fabrication, transport, use, storage, reprocessing and burial.

Briefly, the invention provides a method and apparatus to concentrate very low level gases from the atmosphere, particularly noble gases, and to detect the gases by their radioactive emissions.

BRIEF DESCRIPTION OF THE DRAWINGS

These and other objects and advantages of the present invention will become readily apparent upon consideration of the following detailed description and attached drawings, wherein.

DETAILED DESCRIPTION OF THE INVENTION

The inventors have developed a method and apparatus to detect low levels of radioactive noble gases in the atmosphere by concentrating the gases in an organic fluid prior to analysis. In paricular, the apparatus and method concentrate radioactive xenon, krypton, and radon. The concentrated gases may be released from the organic fluid for analysis or may be analyzed while still contained in the fluid.

Figure 1:
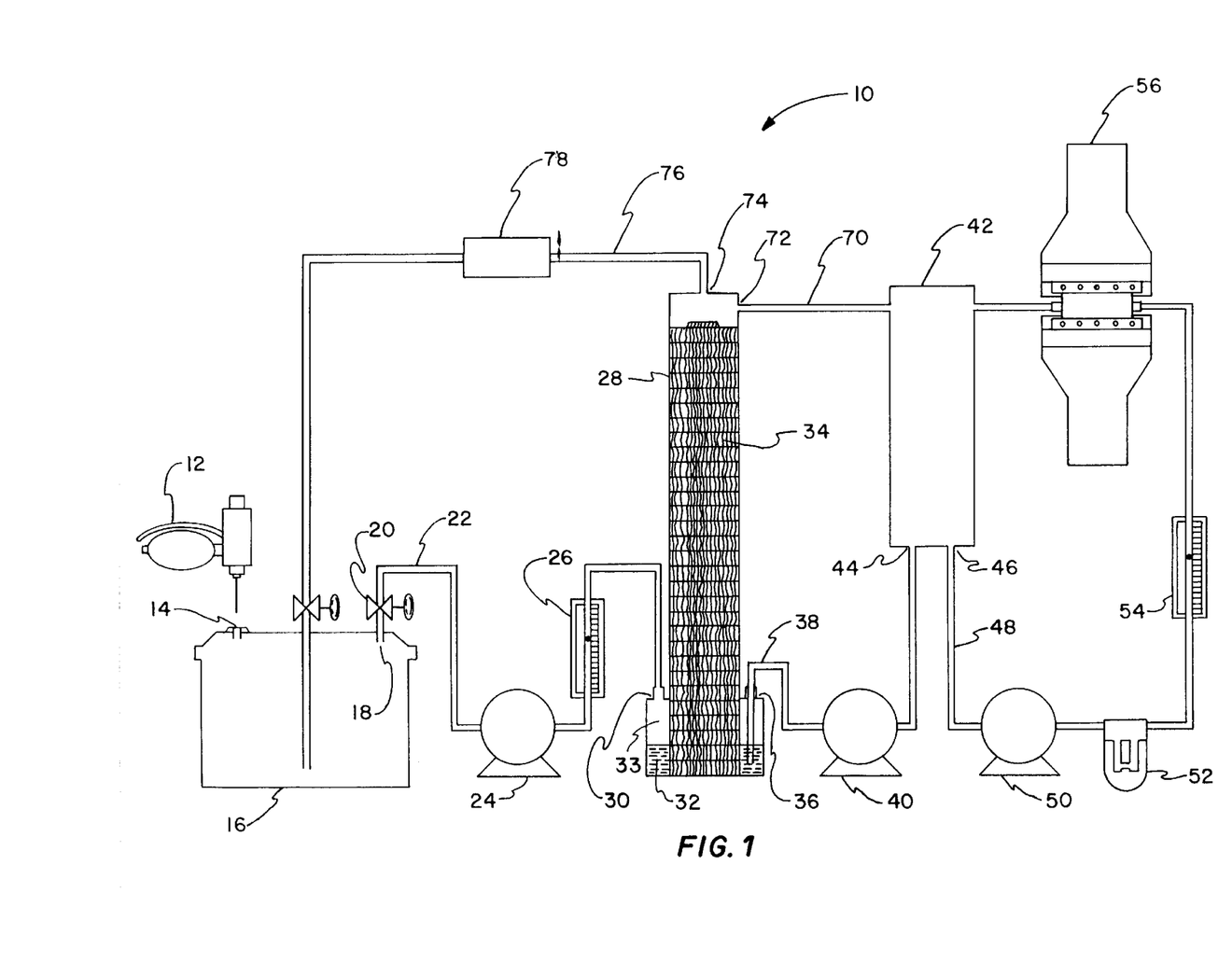
FIG. 1 is a schematic diagram of a typical sampling device.

Referring to FIG. 1, a typical concentration and detection device 10 is shown. For calibration and efficiency testing of the invention, radioactive noble gases are injected via radio nuclide injector 12 into the environmental chamber 16 through inlet 14. Inlet 14 has an air tight rubber septum through which the radioactive noble gases may be injected. The purpose of the environmental chamber 16 is to provide a known and controlled volume for dilution of noble gases so that the detector may be calibrated or tested with a known constant gas concentration. For actual sampling of the atmosphere, an air sample would be pumped through chamber 16. The atmospheric sample exits chamber 16 via outlet 18 through valve 20 into tubing 22. The atmospheric sample is pumped from tubing 22 by pump 24 into the absorption tower 28. Sample flow is regulated by flowmeter 26. The experimental configuration illustrated in FIG. 1 allows variable flow rates for both the atmospheric sample and also the organic fluid sample so that a range of flow conditions can be used to optimize performance. In a commercial version, the flow rates may be set to a constant, optimized value and hence the flowmeters may be omitted.

The atmospheric sample enters the absorption tower 28 through inlet 30. The sample flows upward across structure packing material 34. The structured packing material is designed to optimize the surface to volume ratio of the fluid/gas flow and increase the absorption efficiency of the radioactive noble gases into the organic fluid 32. Typical parking material may be Raschig rings, ceramic or glass beads, intalox saddles, berl saddles, or pall rings. The organic fluid flows in a reverse direction to the atmospheric sample entering the top of the absorption tower 28 through inlet 72 and down through the structured packing material 34 into a small reservoir 33. The organic fluid containing the concentrated radioactive gases exits the absorption tower through outlet 36. The air that has been stripped of noble gases exits via outlet 74 into tubing 76. Fluid vapors are removed from the air by filter 78. The air is then vented to atmosphere or returned to the environmental chamber 16. The fluid gas mixture is pumped through tubing 38 by pump 40 to the inlet 44 of the degasser 42. In the degasser the radioactive noble gasses are separated from the organic fluid by heat, mechanical agitation, ultrasound vibration, microwave radiation or by passing the fluid gas mixture over a surface as a thin film. The concentrated radioactive noble gases exit the degasser 42 at outlet 46 into tubing 48. The gases are pumped by pump 50 through organic fluid filter 52 and flowmeter 54 to detector 56. The organic fluid is returned from the degasser 42 via tubing 70 to inlet 72 of the absorption tower 28.

Organic fluid

A number of organic fluids such as vegetable oils, animal oils, petroleum oils, and mineral oils have been tested. Corn oil has been shown to have the highest absorption capacity per-fluid cost.

Figure 8:
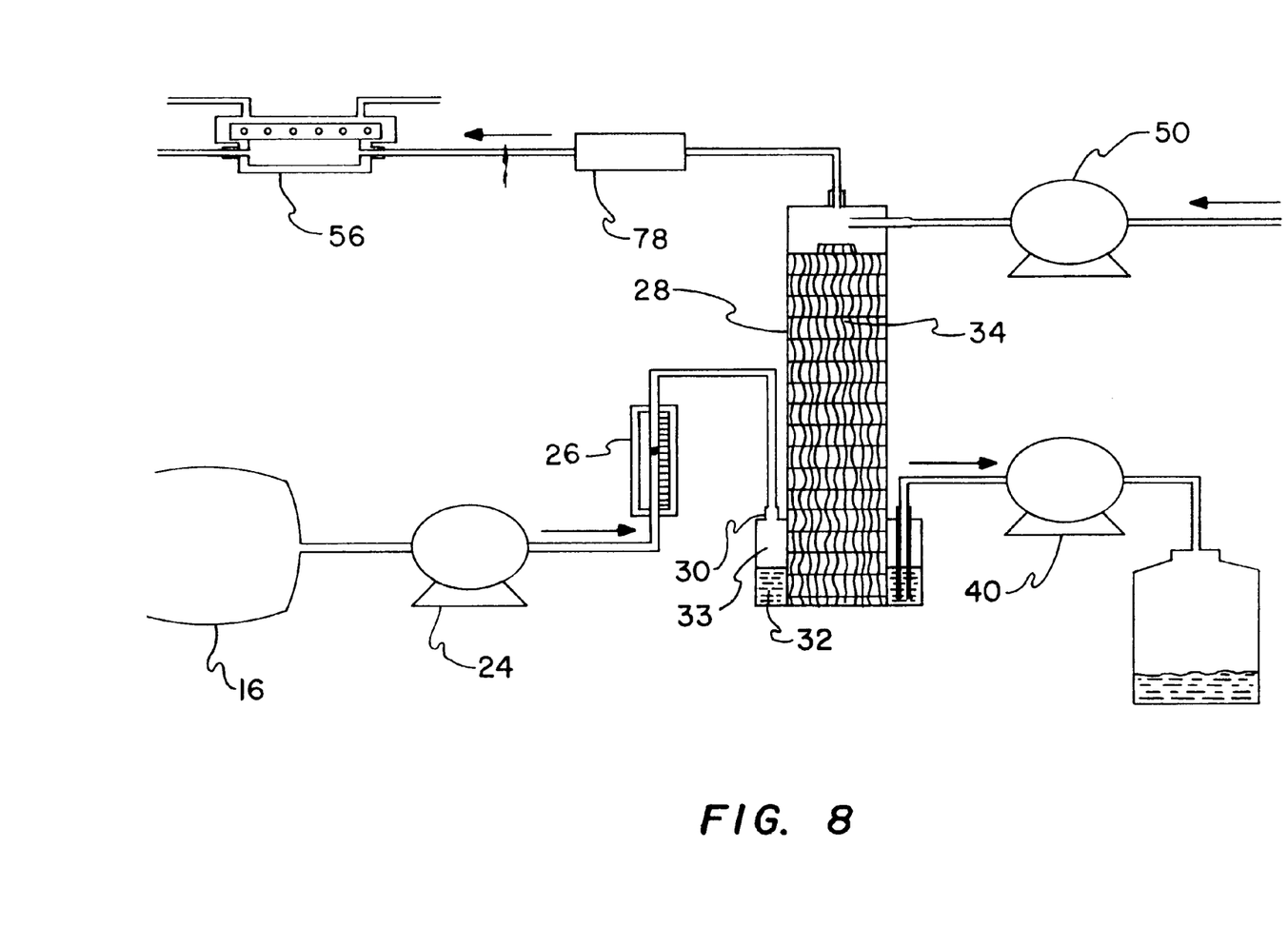
FIG. 8 is a schematic diagram of the absorption efficiency testing device.

A series of experiments have been conducted to test the absorption of xenon in corn oil. The basic experimental arrangement for the absorption experiments is shown in FIG. 8. In these experiments, a 20 liter double lined plastic bag was filled with standard air along with a known activity of radioactive Xe-133. The Xe-133/air mixture flowed into the bottom of the absorption tower which consisted of a 7 cm diameter by 35 cm long cylindrical tube filled with 0.64 cm Raschig rings. The air was vented near the top of the tower into a detector. The detector consisted of a flow through chamber with a windowed gas filled proportional counter on one side of the flow through chamber. The calibrated proportional counter was used to monitor the Xe-133 activity in the flow through chamber.

After starting the flow of the Xe-133/air mixture through the tower, the count rate in the detector was allowed to stabilize. The corn oil was then introduced, flowing at a constant rate through the tower until the count rate in the detector stabilized. The reduction in Xe-133 activity at the tower outlet indicated the removal efficiency for that specific experiment. Several experiments were preformed using this method with different Xe-133 activities and different flow rates. A removal factor as much as 57% was measured during these tests. The packing material height (35 cm) in the absorption tower was constrained by the height of the charcoal filtered hood where these experiments were conducted. Using either a taller bed of packing material or multiple absorption towers should result in significantly better absorption efficiencies.

Similar experiments have been conducted to study radon absorption in corn oil. These tests included introducing two contaminant gases, $CO_2$ and $H_2O$, to a radon/air mixture. It was a concern that these two gases would compete with the radon absorption phenomenon or decrease the absorption capacity of the corn oil. However, it was found that the $CO_2$ had no affect on the radon removal capacity. A slight decrease was detected when the inlet air stream had a relative humidity of 100%. Similar results are expected for xenon.

When the corn oil is heated above 60° C., it has a significantly reduced affinity for noble gas absorption and eventually releases most of the trapped xenon. This degassing effect is further promoted by agitation of the corn oil. The use of heat and sonification together has been demonstrated to remove xenon at a faster rate than the use of heat alone. One concern of the degassing is the potential buildup of radon isotopes in the detection loop. Since ambient levels of radon can exceed 10 mBq/l, buildup of radon may cause excessive background in the radioxenon detector, lowering its sensitivity to radioxenon. Temperature dependent solubility coefficients for radon and xenon differ in the same organic fluids so that one may be degassed at a temperature without significantly degassing the other.

On a molecular level, the mechanism responsible for the strongly temperature dependent noble gas absorption/desorption phenomenon in certain organic fluids is not fully understood. It is postulated that there may be a clathrate effect, wherein the heavy monatomic noble gas atoms are trapped in the interstitial spaces of the much larger fluid molecules. This effect is consistent with observations that the mechanism works only with certain heavy noble gases (Rn, Xe, Kr) and not with lighter noble gases (He, Ne, Ar). Clathrates are known to trap only those atoms and other molecules within a size range that fits snugly into the hosts interstices. An alternate hypothesis is that there is an unknown temperature dependent solubility phenomenon that fortuitously absorbs and releases these noble gases between the convenient temperatures of 20 and 60° C.

Detectors

Several types of detectors may be used including proportional detectors, gas proportional scintillation detectors, scintillation detectors, semiconductor detectors, Phoswich detectors, flow-cell detectors, and Lucas cell-based detectors. For some applications, combinations of these detectors may be used.

Figure 2:
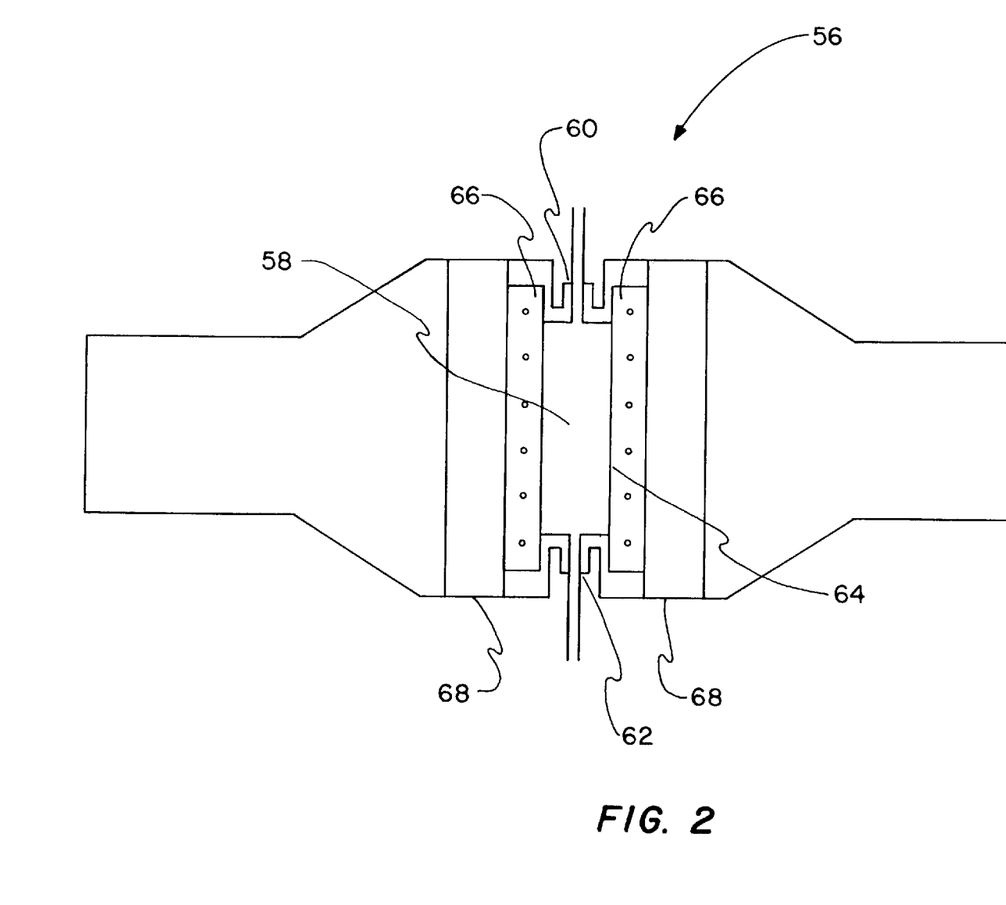
FIG. 2 shows a partial cut away view of a gas proportional/scintillation detector.

FIG. 2 shows a partial cut away view of a gas proportional scintillation detector. Concentrated radioactive gases released from the organic fluid enter the axially located flow through chamber 58 via inlet 60 and exit through outlet 62. The flow through chamber has Mylar™ windows 64 to gas proportional counters 66 symmetrically located around the flow through chamber. Typical fill gases for the gas proportional counters are krypton, xenon, argon, methane, and ethylene. In the preferred embodiment a pair of gas proportional counters are oppositely located along the flow through chamber 58. The gas proportional counters are surrounded by two NaI(Tl) scintillators 68. Signals from both the gas proportional counters and the scintillators are analyzed using coincidence electronics, not shown, resulting in a beta/photon coincidence detector.

Xe-133, Xe-133m, and Xe-135 decay by either beta particle emission or internal electron conversion. There are also finite probabilities that each decay involves the emission of one or more photons (gamma or X-ray) with the emitted electron. It is the energy of these photons that most effectively determines which xenon isotope was involved in the decay. Detection of these photons can be accomplished by using the NaI(Tl) scintillators. However, the background associated with typical NaI(Tl) scintillators can easily obscure the valid photon data from radioxenon at very low concentrations. Therefore it is desirable to record only those photon events in the scintillator when the associated energetic electron is also detected. Most of the scintillator background can be eliminated by using coincidence mode detection, permitting quantification of radioxenon at much lower activities.

Figure 3:
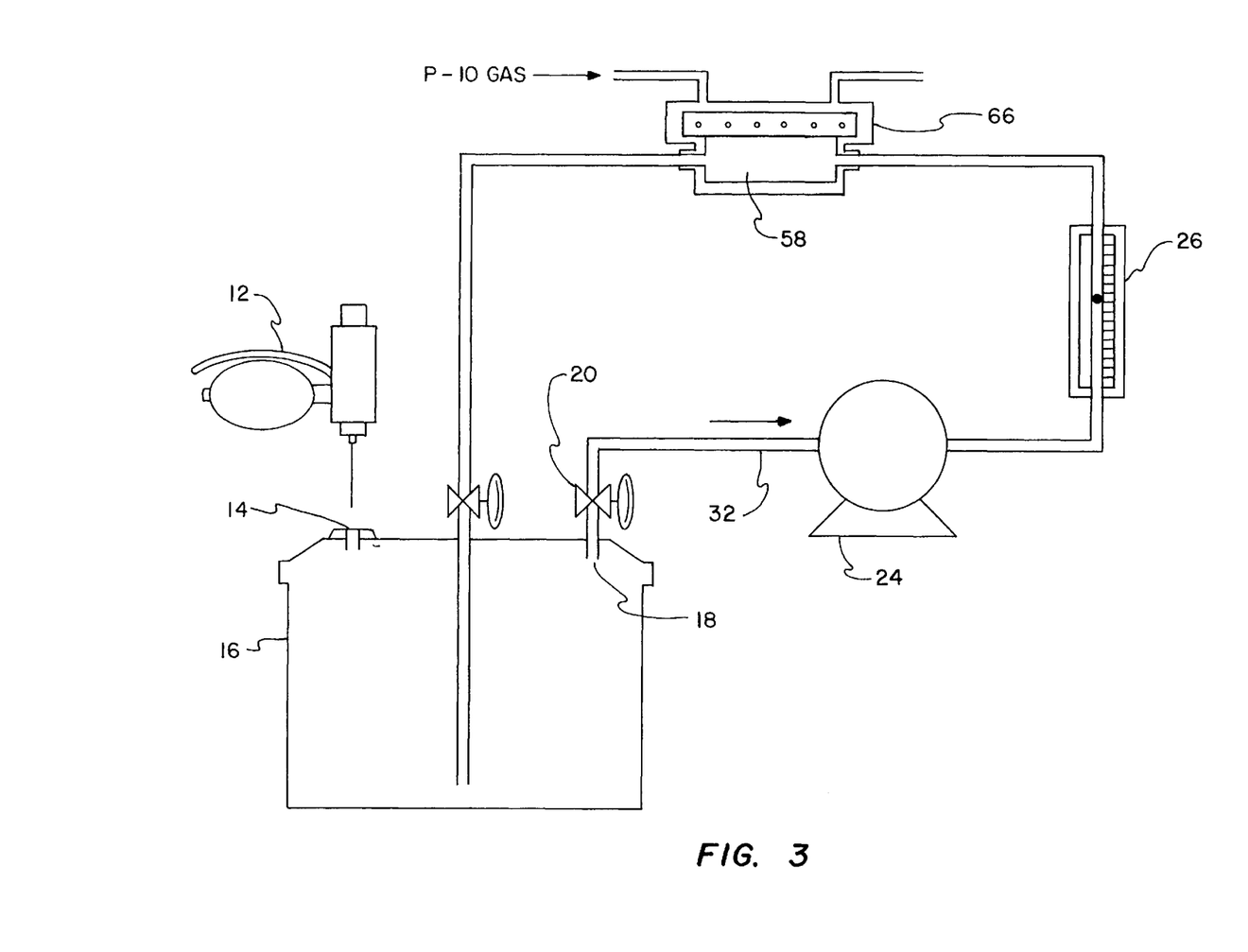
FIG. 3 is a schematic diagram of the calibration device.
Figure 5:
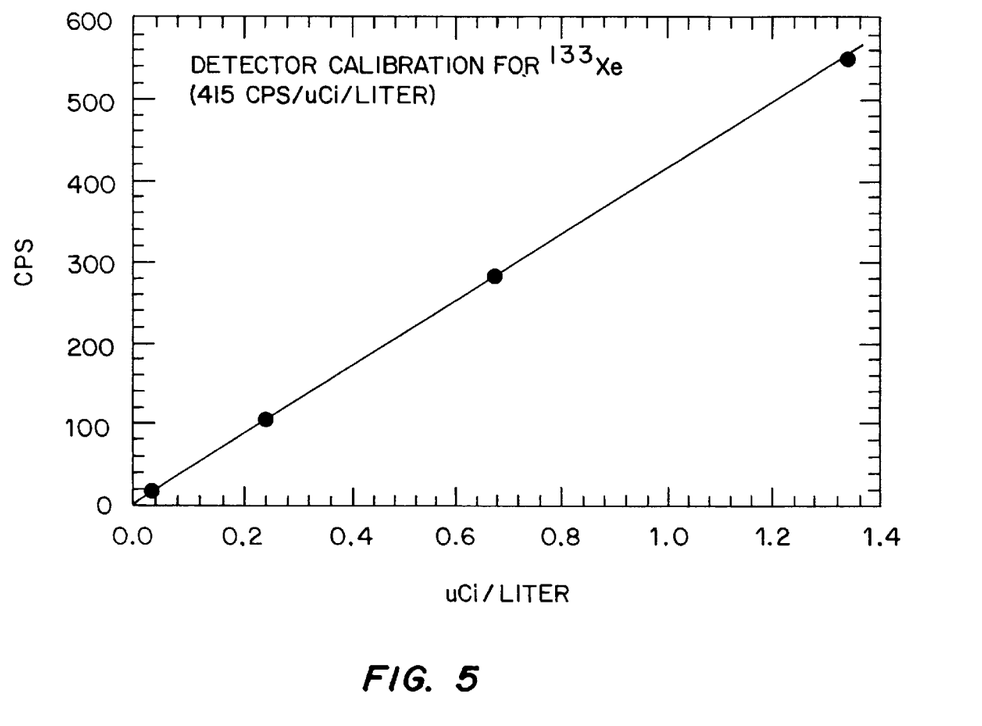
FIG. 5 represents the calibration curve for one of a pair of proportion detectors shown in FIG. 2.

To detect the energetic electrons emitted by the xenon and to provide the required coincidence timing signal, gas proportional counters were used. The actual detector configuration used in the feasibility experiments was one side of the detector shown in FIG. 2. FIG. 3 is a schematic diagram of the calibration device used in the feasibility experiments. Radioactive xenon was injected into the environmental chamber 16 through inlet 14 by radio nuclide injector 12. The xenon is pumped by pump 24 through the outlet 18 and valve 20 via tubing 22 to the flowmeter 26. From the flowmeter the xenon enters the flow through chamber 58. In FIG. 3 the detector is one of a pair of proportional counters shown in FIG. 2. P-10 gas is pumped into the proportional counter 66 through inlet X and exits via outlet X. The straight line observed in FIG. 5 shows the calibration was very successful, demonstrating a high degree of linearity for a range of 0.0 to 1.35 $\mu$Ci/liter xenon air mixture. Approximately a 30% efficiency was obtained using only one of the pair of proportional detectors. A 60–75% efficiency is projected for the detector shown in FIG. 2. The background count rate was not a factor in these results because it was very small, less than 1 count/second.

In addition, the proportional counter provides information on the energy deposited in the detector chamber. This energy information is useful for discriminating against radionuclides that decay by emitting alpha particles. This discrimination capability may be important for minimizing the influence of radon in the detector loop.

Figure 4:
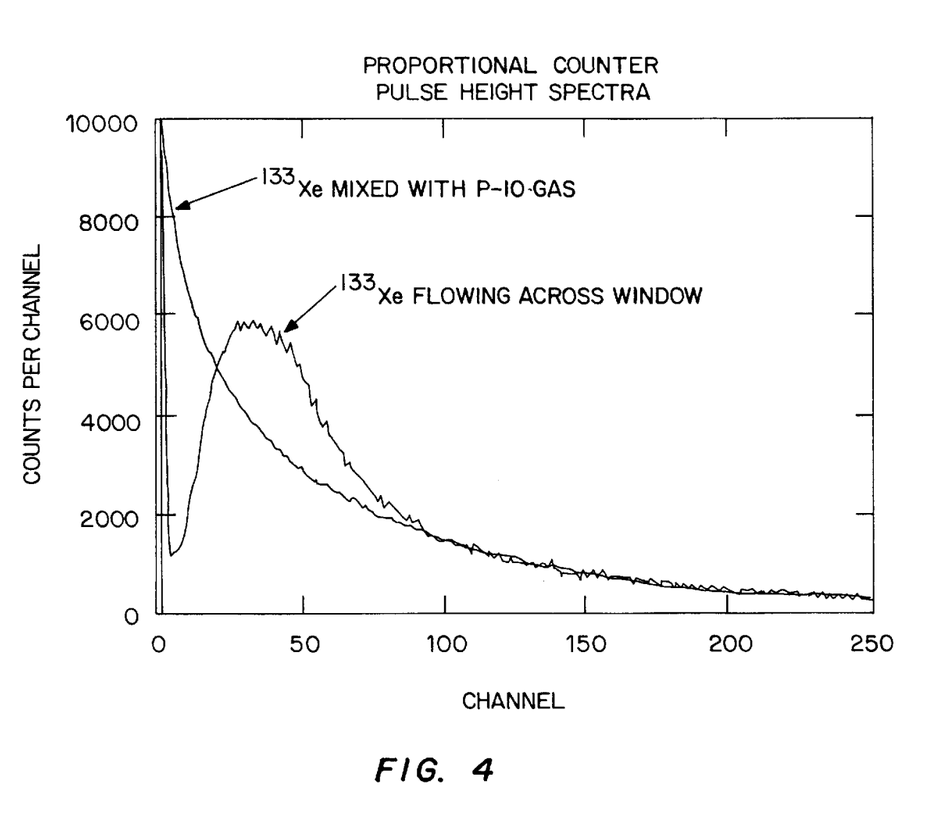
FIG. 4 is a graph of the contrast between a proportional counter using a mixture of P-10 gas and radioactive xenon with the same proportional counter using just P-10 and the radioactive xenon external to the proportional counter.

An advantage of this method is that the radioactive gases do not need to be first mixed with P-10 gas (10% xenon, 90% methane) or any other carrier gas. The problems that arise when the radioactive gas is mixed with P-10 are illustrated in FIG. 4. FIG. 4 shows the exponentially decreasing curve resulting from mixing the radioactive xenon with P-10 as opposed to the broad and reproducible peak form when xenon is injected into the detector without a carrier. The problems are mostly due to wall effects. Beta emission from the decay of the radioactive gas can deposit on the walls of the detectors, making it difficult to obtain an accurate reading. In the present invention the radioactive gas flows through a chamber incased Mylar™ windows and proportional counters. The discrimination levels are then set at the upper and lower cutoffs for this broad peak, which gives good statistical accuracy for the integrated counts under the peak thereby favoring optimal detection efficiency. The detector is very stable since no mixing of gases occurs.

Using the signal from the proportional counter to gate (trigger) the NaI(Tl) scintillator results in photon interactions in the scintillator being recorded only when a valid signal is simultaneously generated by the gas proportional counter. This method of gating the NaI(Tl) scintillator eliminates most of the background associated with the detector. As much as four orders of magnitude reduction in scintillator background can be achieved with this technique. It is estimated that concentrations in air of 0.005 Bq/l may be measurable. Assuming a xenon concentration factor of 1000, as compared to atmospheric levels, then airborne radioxenon concentrations down to 5 ЂBq/l should be measurable with this invention.

Figure 6:
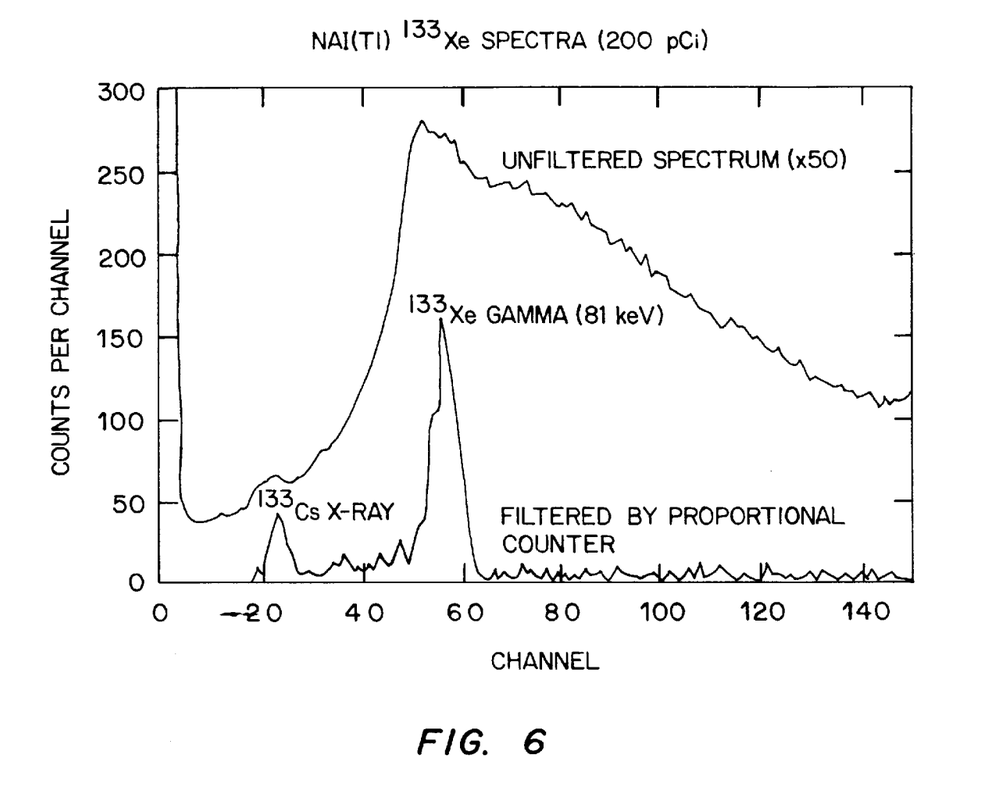
FIG. 6 represents the gated and ungated xenon peaks for a NaI(Tl) scintillation detector.
Figure 7:
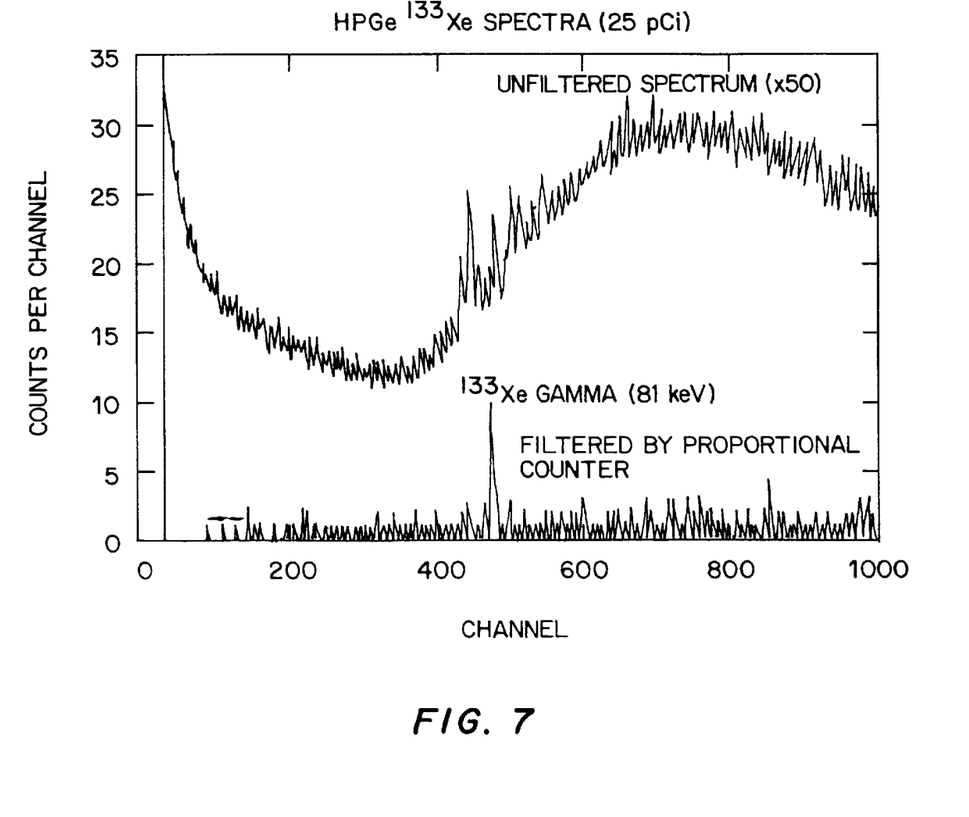
FIG. 7 represents the gated and ungated xenon peaks for a HPGe semiconductor detector.

FIGS. 6 and 7 demonstrate the advantages of using a proportional detector to gate the radioactive emissions to a scintillation detector. FIG. 6 contrasts the poorly resolved peak using a NaI(Tl) scintillation detector to the peak resulting from a proportional detector gating the signal to the NaI(Tl) detector. FIG. 7 illustrates the improved peak resolution using a proportional detector to gate signal to a HPGe scintillation detector. Xenon peak resolution with the ungated spectra would be extremely difficult. The easily identifiable peaks in the gated spectra substantially enhance overall counting statistics.

The concentrated radioactive gas exits the flow through chamber 58 via outlet 62 and recycles throhg the degasser 42 tosweep additional radioactive gas out of the organic fluid in the degasser. If no radioactive gas was detected the sample may be reconcentrated with more atmospheric sample. Or if radioactive gas was detected the gas exits the absorption tower via outlet 74 through tubing 76 and filter 78 and returns to the environmental chamber 16 for removal.

While the invention has been described with reference to details of the illustrated embodiment, these details are not intended to limit the scope of the invention as defined in the appended claims.

The embodiment of the invention in which an exclusive property or privilege is claimed is defined as follows:

1. A method for detecting radioactive noble gases comprising:
   providing a gas stream containing radioactive noble gases;
   concentrating the radioactive noble gases in an oil;
   transferring the concentrated radioactive noble gases to a means for detection; and detecting radiation from the gases.

2. The method of claim 1 wherein the radioactive noble gases are selected from a group consisting of krypton, xenon, radon and combinations thereof.

3. The method of claim 1 wherein the oil is selected for a group consisting of a vegetable oil, petroleum oil, animal oil, mineral oil and combinations thereof.

4. The method of claim 1 wherein the radioactive gases are concentrated in the oil by pumping samples containing the gases through the oil.

5. The method of claim 4 wherein the samples are atmospheric air samples.

6. The method of claim 1 wherein the detected radiation is alpha, beta, gamma radiation or combinations thereof.

7. The method of claim 1 wherein the means for detection is selected form a group consisting of a proportional detector, a gas proportional scintillation detector, a scintillation detector, a semiconductor detector, a Phoswich detector, a flow-cell detector, a Lucas cell-based detector and combinations thereof.

8. The method of claim 1 wherein the radioactive noble gases surround the means for detection.

9. The method of claim 1 wherein the radioactive noble gases are contained within the means for detection.

10. The method of claim 1 wherein the concentrated gases are released to the means for detection by heating, mechanically agitating, ultrasound vibrating, microwave radiating, and combinations thereof.

11. The method of claim 1 wherein the gases in the samples are in the range of parts per million to parts per trillion.

12. An apparatus for the detection of radioactive noble gases comprising:
   a means for injecting an atmospheric gas sample containing radioactive noble gases into an absorption tower;
   an absorption tower for absorbing the radioactive noble gases into an oil;
   the oil;
   a degasser for separating the concentrated radioactive noble gas from the oil connected to the absorption tower; and
   a means for detecting the radioactive emissions from the noble gas.

13. The apparatus of claim 12 wherein the means for injecting the atmospheric gas sample comprises:
   an environmental chamber having an inlet for the atmospheric gas sample, a hollow body for containing the sample, and an outlet for transfer of the sample;
   a first pump connected to the environmental chamber for transport of the sample; and
   a flowmeter connected to the first pump for regulating the flow of the sample.

14. The apparatus of claim 12 wherein the absorption tower comprises:
   a first inlet for receiving the atmospheric gas sample containing radioactive noble gases;
   an oil reservoir in direct communication with the first inlet;
   oil for concentrating the radioactive noble gas;
   a chamber for contacting the oil with the atmospheric sample;
   packing material contained within the chamber to facilitate contacting the oil with the atmospheric sample;
   a first outlet connected to the oil reservoir for removal of the oil containing concentrated radioactive noble gases;
   a second inlet for the injection of oil; and
   a second outlet for the removal of the atmospheric sample.

15. The apparatus of claim 12 wherein the degasser comprises:
   a pump connected to the first outlet of the absorption tower for transporting the organic fluid radioactive noble gas mixture to the degasser;
   a first inlet for receiving the fluid gas mixture from the pump;
   a means for separating the radioactive noble gas from the oil;
   a first outlet for transporting the concentrated radioactive gas to the means for detecting radioactive emissions;
   a second outlet for returning the oil to the absorption tower connected to the second inlet of said absorption tower; and
   a second inlet for returning the radioactive gases to the top of the degasser.

16. The degasser of claim 15 wherein the means for separating the radioactive noble gas from the oil is selected from the group consisting of heating, mechanically agitating, ultrasound vibrating, microwave radiating, and combinations thereof.

17. The apparatus of claim 12 wherein the means for detecting radioactive emissions is selected from the group consisting of a proportional detector, a gas proportional scintillation detector, a scintillation detector, a semiconductor detector, a Phoswich detector, a flow-cell detector, a Lucas cell-based detector and combinations thereof.

18. The apparatus of claim 12 wherein the oil is selected from the group consisting of a vegetable oil, petroleum oil, animal oil, mineral oil and combinations thereof.

19. The apparatus of claim 12 wherein the oil is corn oil.

* * * * *